June 23, 1964 S. TARANTUR 3,138,756

TRANSISTOR REFLEX AMPLIFIER WITH DIRECT CURRENT AMPLIFICATION

Filed Oct. 31, 1960 4 Sheets-Sheet 1

INVENTOR.
Sam Tarantur
BY John L. Wiegreffe
ATTY.

June 23, 1964 S. TARANTUR 3,138,756
TRANSISTOR REFLEX AMPLIFIER WITH
DIRECT CURRENT AMPLIFICATION
Filed Oct. 31, 1960 4 Sheets-Sheet 2

INVENTOR.
Sam Tarantur
BY [signature]
ATTY.

June 23, 1964 S. TARANTUR 3,138,756

TRANSISTOR REFLEX AMPLIFIER WITH DIRECT CURRENT AMPLIFICATION

Filed Oct. 31, 1960 4 Sheets-Sheet 3

INVENTOR.
Sam Tarantur
BY John L. Wiegreffe
ATTY.

June 23, 1964 S. TARANTUR 3,138,756

TRANSISTOR REFLEX AMPLIFIER WITH DIRECT CURRENT AMPLIFICATION

Filed Oct. 31, 1960 4 Sheets-Sheet 4

INVENTOR.
Sam Tarantur
BY John L. Wiegreffe
ATTY.

3,138,756
Patented June 23, 1964

3,138,756

TRANSISTOR REFLEX AMPLIFIER WITH DIRECT CURRENT AMPLIFICATION

Sam Tarantur, River Grove, Ill., assignor to Admiral Corporation, Chicago, Ill., a corporation of Delaware Filed Oct. 31, 1960, Ser. No. 65,984
13 Claims. (Cl. 325—319)

This invention relates to radio receiving apparatus. While the invention as taught in the following specification will find application in many types of radio receiving apparatus, it will find its greatest and most immediate application in entertainment type radio receiving apparatus.

The invention will be described in the environment of a transistorized portable radio receiver. It will be appreciated that the choice of environment is merely for the convenience of explaining the operation of the invention and in no way constitutes a limitation thereof. Illustrations of the invention utilizing vacuum tubes are not given since such modifications are deemed to be within the skill of those versed in the art. Similarly, although transistors of the PNP type are utilized throughout the specification and drawings, it will readily be appreciated that transistors of the NPN type may be substituted with appropriate changes in circuit polarities.

In the field of radio receiving apparatus generally, and in the field of such apparatus for portable use specifically, continuous effort has been expended in developing apparatus that is more economical to manufacture, smaller in size, and requires less operating power. The main limitation on such efforts has been the requirement of maintaining certain performance standards in the apparatus. The development of the reflex circuit marked a significant advance towards this goal.

The reflex circuit, which is well known in the art, utilizes a single amplifier stage for amplification at two different frequencies. In a practical circuit, the reflex stage comprises a combined intermediate frequency and audio frequency amplifying stage. The reflex stage initially amplifies an I–F signal which is then detected in a detector stage. The detected audio signal is then fed back to the reflex stage where it too is amplified. Such circuits have been in general use for many years and are attractive, especially for portable type receivers, since two distinct amplifying functions are performed in a single stage.

The present invention contemplates extracting yet another function from a reflex stage. By following the teachings of the invention, an amplifier stage may be designed which will produce the following functions: (1) intermediate frequency amplification; (2) audio frequency amplification; and (3) direct current amplification. The uses to which the amplified direct current voltage may be put are quite numerous, an obvious one of which is for automatic volume or automatic gain control.

Accordingly it is a general object of this invention to provide improved radio receiving apparatus;

Another object of this invention is to provide radio receiving apparatus which is more compact in size and less costly to manufacture than similar apparatus of comparable performance heretofore known;

A more specific object of this invention is to provide intermediate frequency amplification, audio frequency amplification, and direct current amplification in a single amplifying stage;

A further object of this invention is to provide a single transistor amplifier which is capable of amplifying intermediate frequencies, audio frequencies, and direct current.

It is a still further object of this invention to provide a transistorized radio receiver with an improved method of obtaining automatic gain control without substantially increasing the cost of the receiver.

Further objects of this invention will be apparent to those skilled in the art upon reading the specification in conjunction with the drawings in which.

Figure 1:
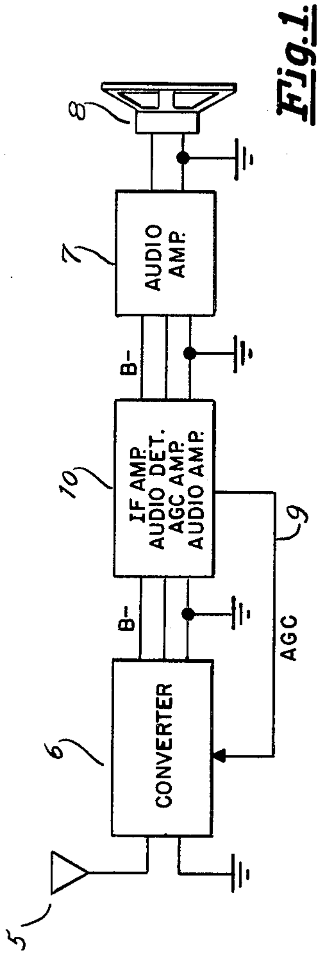
FIG. 1 represents a block diagram of a radio receiver utilizing the invention.

Referring now to FIG. 1, an antenna 5 receives amplitude modulated radio frequency carrier waves emanating from various transmitting stations in the area. Converter 6 converts the selected one of these radio frequency waves to an intermediate frequency wave of constant frequency, in a well known manner. The intermediate frequency signal is fed to block 10 which includes an intermediate frequency amplifier, an audio frequency detector, an audio frequency amplifier and an automatic gain control, hereinafter referred to as AGC, amplifier. The amplified audio frequency signals are fed to a further audio amplifier 7 and thence to a sound reproducing device 8. Additionally, AGC voltage is fed from block 10 over lead 9 back to converter 6 for controlling the converter gain or efficiency in the presence of strong signals. As shown in FIG. 1, the block diagram may have application to any number of radio receiving apparatus in use today.

Converter 6 should be understood to include at least a local oscillator and mixer for producing an intermediate frequency beat signal as a result of mixing the oscillator signal and the received radio frequency signal. Additionally, converter 6 may include one or more stages of radio frequency amplification. Present day practice in amplitude modulated radio receiving apparatus specifies an intermediate frequency of 455 kilocycles per second, and, for purposes of convenience, it will be assumed throughout the specification that this particular value of intermediate frequency is used.

Figure 2:
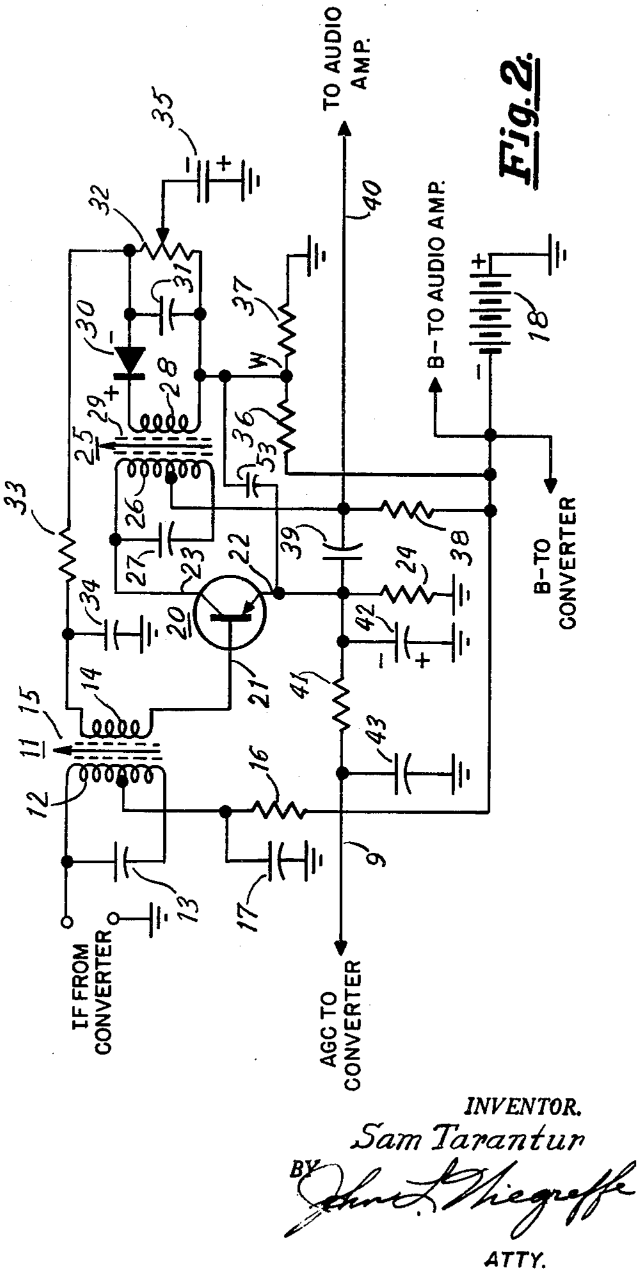
FIG. 2 represents a schematic diagram of the inventive portion of the block diagram of FIG. 1.

FIG. 2 is a detailed schematic drawing of the elements in block 10 of FIG. 1. The major components of FIG. 2 are an I–F transformer 11, a transistor 20 having a base electrode 21, an emitter electrode 22 and a collector electrode 23, an I–F transformer 25, a diode detector 30 and a potentiometer 32. I–F transformer 11 includes; a tuned circuit consisting of a primary winding 12 and a parallelly connected capacitor 13; a secondary winding 14; and an adjustable core 15. In practice, I–F transformer 11 is peaked at 455 kilocycles per second by varying the position of core 15 with respect to the transformer windings. A source of potential 18 is connected to primary winding 12 of transformer 11 through a resistor 16, which resistor is bypassed to ground by a capacitor 17. The combination of resistor 16 and capacitor 17 comprises a decoupling network for decoupling the signal in the previous stage from potential source 18.

The I-F signal from converter 6 is fed to primary winding 12 of transformer 11 and results, by transformer action, in a corresponding signal being generated in secondary winding 14. One end of winding 14 is connected to base 21 of transistor 20. The other end of winding 14 is connected through a resistor 33 and potentiometer 32 to a point W on a voltage divider network comprising resistors 36 and 37 connected across potential source 18. Thus it will be seen that base 21 is biased slightly negative with respect to emitter 22. Capacitor 34 bypasses the I-F signal so that winding 14 is effectively connected between emitter 22 and base 21 of transistor 20.

The signal applied to base 21 of transistor 20 gives rise to a base-emitter current which varies in accordance with signal variations. By transistor action, this base-emitter current gives rise to and controls the flow of the much larger collector-emitter current.

Figure 3:
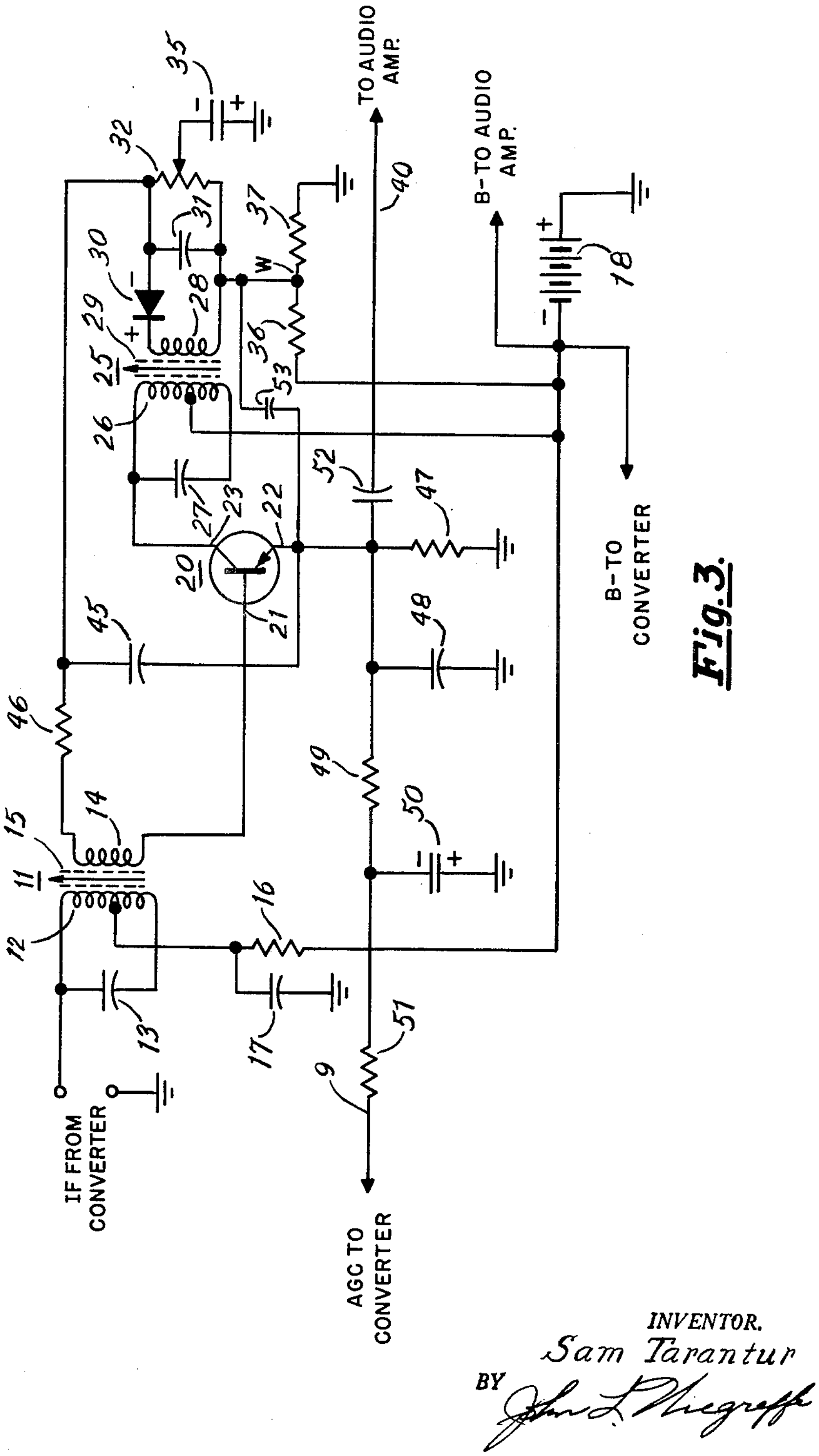
FIG. 3 represents a modification of the diagram of FIG. 2.

It should be pointed out here that transistor 20, in both FIGS. 2 and 3, is biased in the region of relatively constant gain. Therefore, except for large variations, changes in the emitter-base will not substantially change the transistor gain. This condition is in contrast with that of transistor 130 in FIG. 4, which is biased such that decreases thereof will correspondingly decrease the transistor gain. Transistor 130 in FIG. 5 is biased like transistors 20 in FIGS. 2 and 3.

Another I-F transformer 25, consisting of a primary winding 26, a secondary winding 28 and an adjustable core 29, is connected in the collector circuit. A capacitor 27 is connected in parallel with primary winding 26 and transformer 25 is "peaked" at the I-F frequency by adjusting core 29. Thus for I-F frequencies, winding 26 and capacitor 27 form the collector load of transistor 20. It should be noted that at relatively low frequencies capacitor 39, connecting a point on winding 26 to emitter 22, has substantial impedance. However, for intermediate frequencies on the order of 455 kilocycles per second, capacitor 39 is essentially a short circuit and effectively connects emitter 22 to primary winding 26. Thus, the I-F output signal of transistor 20 is developed substantially only across winding 26 and is coupled by transformer action to secondary winding 28.

As mentioned previously, resistors 36 and 37 comprise a voltage divider connected across potential source 18. The bias current for the base-emitter junction of transistor 20 is supplied from point W on this voltage divider, through potentiometer 32, resistor 33, and winding 14 of transformer 11. This current flow develops a potential across potentiometer 32 and results in its lower terminal being slightly more negative than its upper terminal. This developed potential places a forward bias potential across diode 30, which is utilized as a detector for separating audio modulations from the intermediate frequency signal. This slight forward bias is necessary to insure linear detector action.

Diode 30 acts as a conventional detector and conducts on negative half cycles of signal, that is when the upper terminal of transformer winding 28 swings negative. Capacitor 31 bypasses the I-F frequency components in the signal, but not the audio frequency components. The load for diode 30, consisting of capacitor 31 and potentiometer 32, has two distinct potentials developed across it. The first of these is an audio frequency voltage which varies in accordance with amplitude variations (audio modulation) of the I-F signal, and the second is a direct current potential which varies in accordance with the signal strength or level of the I-F signal. Of course, the audio modulation in the I-F signal is the same as that in the original RF signal and the signal level of the I-F carrier is a function of the signal level of the RF carrier. A capacitor 53, connected between emitter 22 and winding 28 provides RF bypassing.

The detected signal is then coupled back to base 21 of transistor 20. It should be noted, that for the audio frequencies involved, winding 14 has substantially zero impedance. The path of the audio frequency signal is from ground, through capacitor 35, to the arm of potentiometer 32, through a portion of potentiometer 32, through resistor 33, through winding 14, to the base of transistor 20. The audio frequency signal impressed upon transistor 20 is amplified by transistor 20 but, unlike the I-F signal, does not appear across winding 26 since for these low frequencies winding 26 of transformer 25 has substantially zero impedance. Thus, resistor 38 becomes the collector load for transistor 20. The audio frequency signal appears at the junction of resistor 38 and capacitor 39 and is coupled to the succeeding audio amplifier (not shown) by lead 40. Capacitor 39, it will be recalled, has a value such that substantial impedance is presented to audio frequencies, but very low impedance is presented to the higher intermediate frequencies.

What has been described thus far is substantially the operation of the reflex type circuit in which the detected audio signal is "reflexed" back to the intermediate frequency amplifier stage for audio amplification. However, in the circuit shown, it will be noted that the feedback circuit is direct current coupled. In addition to feeding back the audio portion of the detected signal to the base of transistor 20, the direct current bias on the emitter-base junction of transistor 20 is varied in accordance with the signal level of the I-F carrier. It may readily be seen that any additional potential developed across potentiometer 32 will be in series with the direct current bias circuit. In the case shown, the base-emitter bias potential and current of transistor 20 will increase with increasing signal level. The increased base-emitter bias current of transistor 20 gives rise to an increased collector-emitter current and an increased voltage drop across emitter resistor 24. As stated previously, transistor 20 is operating at a point on its characteristic curve where this increase in base-emitter bias has little effect on the transistor gain. Capacitor 42 provides audio frequency bypassing for resistor 24, and hence substantially zero audio voltage appears at their junction. The direct current potential across resistor 24 is filtered by capacitor 42, resistor 41, and capacitor 43 and is fed back, over lead 9, to the converter for providing AGC control.

It will also be noted that, by varying the position of the arm of potentiometer 32, the amount of detected audio frequency signal fed back to transistor 20 may be varied from a minimum to a maximum. Thus poteniometer 32 may be utilized as a volume control in the radio receiving apparatus. Variations of the potentiometer arm setting do not affect the direct current operation of transistor 20. Therefore, the potential appearing across emitter resistor 24, and ultimately on lead 9, varies only as a function of the signal strength of the intermediate frequency signal.

FIG. 3 depicts a circuit similar to that of FIG. 2, and components performing the same function in each circuit have been designated with like reference numbers. Essentially the difference between FIGS. 2 and 3 is that in FIG. 3 the audio voltage is taken from the emitter of transistor 20 whereas in FIG. 2 the audio voltage is taken from the collector. Operation of the circuit of FIG. 3 is substantially the same as that of FIG. 2, as is the biasing arrangement for transistor 20. A capacitor 45 connects the top of potentiometer 32 to emitter 22 and provides a bypass for the I-F signal appearing across secondary winding 14.

Intermediate frequency signals appearing across winding 14 are amplified by transistor 20 and appear across the winding 26 of transformer 25. Diode 30 detects the intermediate frequency signal and develops a voltage having an alternating current component, which is representative of the original amplitude modulation contained in the received radio frequency carrier and a direct current component, which is indicative of the signal level of the original RF carrier. Both components of this voltage are fed back through resistor 46 and winding 14 to the base of transistor 20 where they are further amplified as peviously described. Both amplified voltage components appear across emitter resistor 47.

A capacitor 52 allows only the alternating current component to appear on lead 40 which goes to a subsequent audio amplifier (not shown). Capacitor 48, which is connected across resistor 47, provides a bypass for removing any intermediate frequency signals appearing at this point, but does not bypass audio frequency signals. Thereafter, resistor 49 and capacitor 50 filter the voltage appearing across resistor 47 to develop an AGC voltage which is fed over lead 9 to the converter.

The circuit of FIG. 3 is therefore seen to perform substantially the same functions as the circuit of FIG. 2, but the audio load for transistor 20 is connected in the emitter circuit whereas in FIG. 2 the audio load is connected in the collector circuit. In both circuits, transistor 20 functions as an intermediate frequency amplifier, an audio frequency amplifier, and a direct current amplifier.

Figure 4:
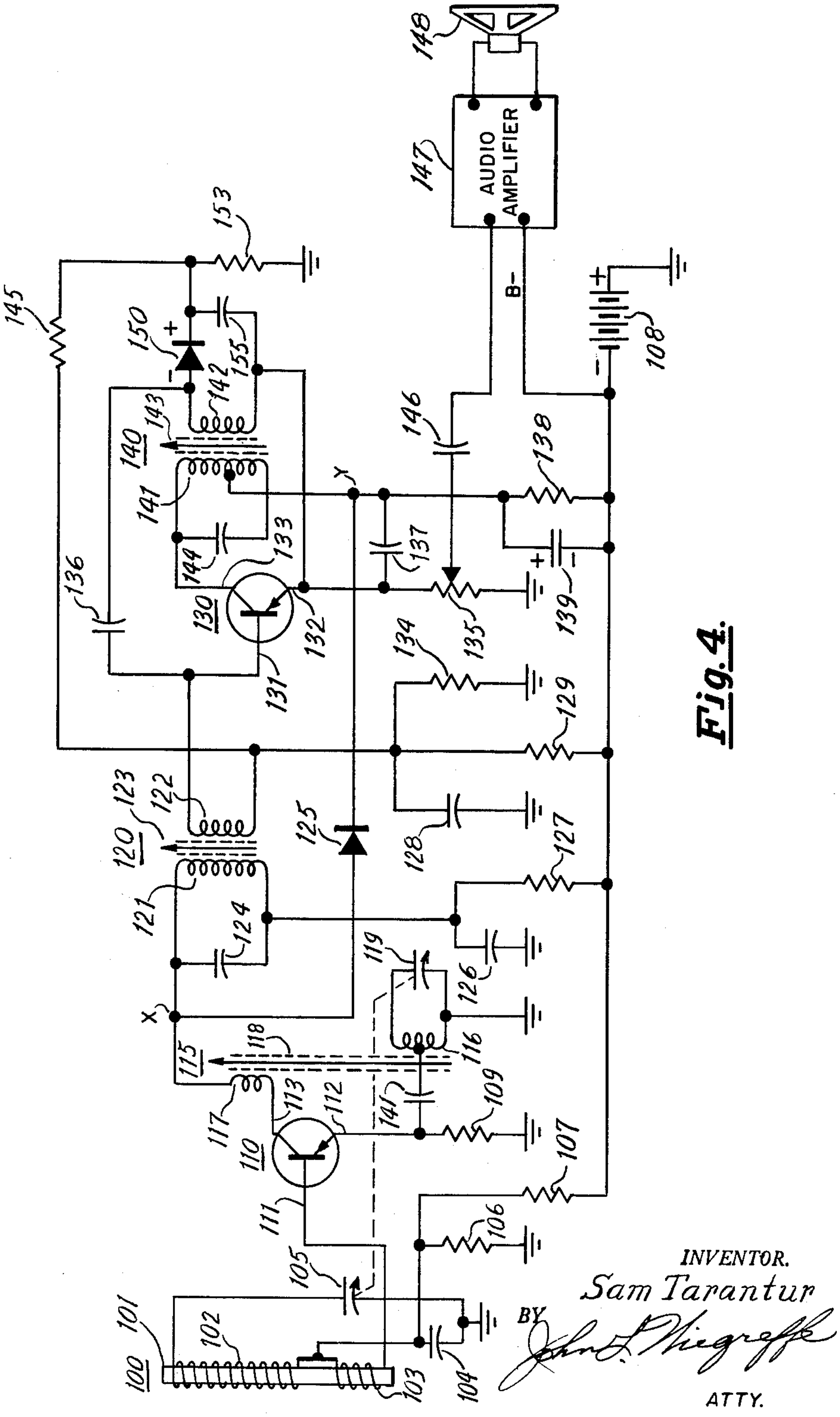
FIG. 4 represents a partial schematic and partial block diagram of the invention as utilized in a transistorized radio receiver incorporating a conventional autodyne converter.
Figure 5:
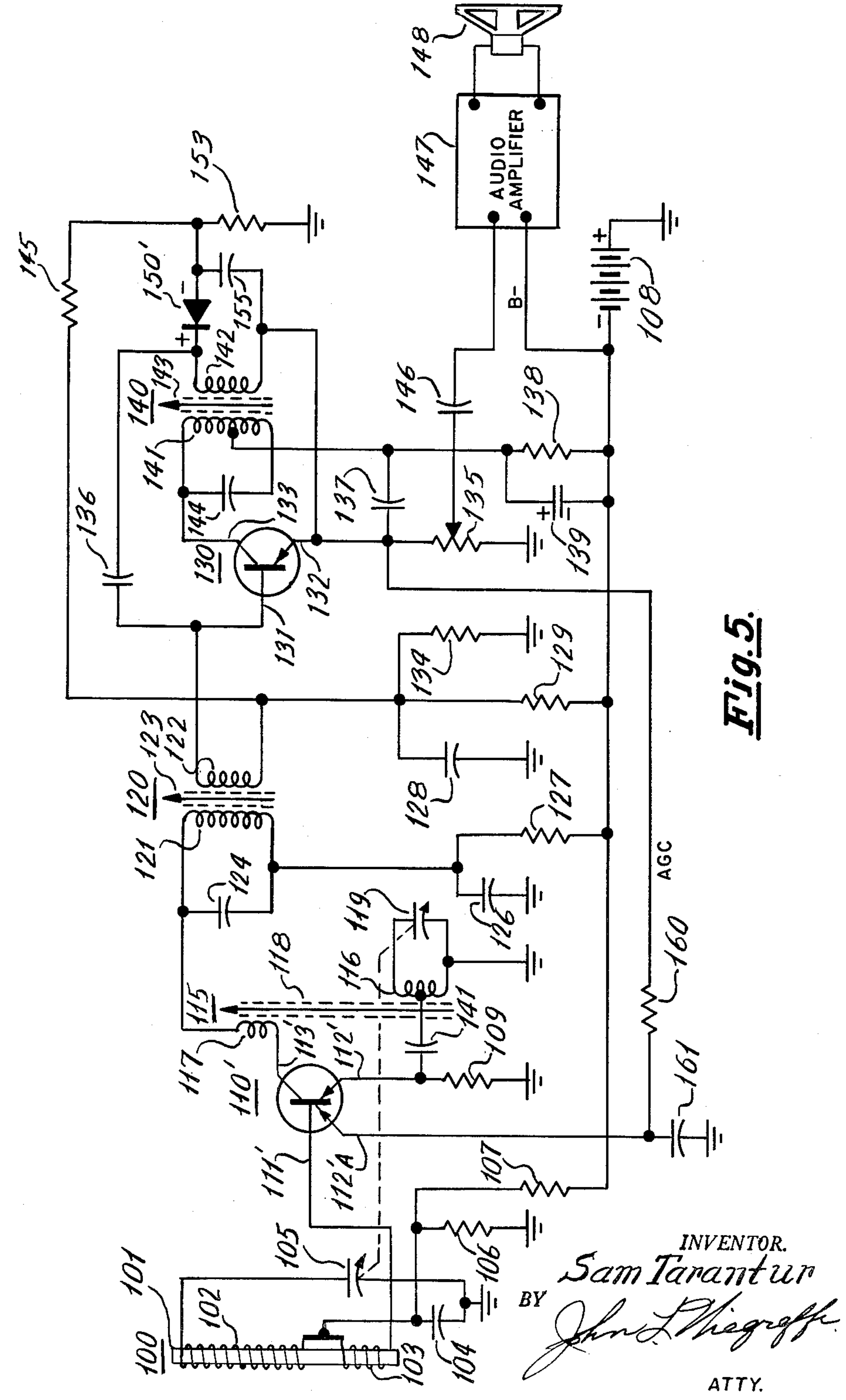
FIG. 5 is a schematic of a preferred embodiment of the invention utilized with an autodyne converter incorporating a double emitter transistor.

FIG. 4 discloses a radio receiver circuit arrangement which utilizes a different form of the invention. In brief this figure discloses the use of the invention with radio receiving apparatus having an autodyne converter "front end." The autodyne converter is well known in the art and will not be described in great detail. It is also well known that this type converter is not satisfactory for use with conventional AGC techniques since such techniques affect the frequency of operation of the oscillator.

Antenna 100 comprises a ferrite core 101 and a pair of coils 102 and 103 wound therearound. A variable tuning capacitor 105 is connected between coil 101 and ground. A fixed bypass capacitor 104 is connected between the junction of coils 102 and 103 and ground. The other terminal of coil 103 is connected to base 111 of transistor 110. By varying the capacitance of tuning capacitor 105, the resonance of the tuned circuit comprising coil 102 and capacitor 105 may be varied to select any of the broadcast carrier frequencies within the tuning range of the receiver. The additional coil 103 on antenna 100 is used as an impedance matching device to obtain a more favorable impedance between the input of the signal source and the input of transistor 110.

Transistor 110 is also part of an oscillator circuit comprising an oscillator coil 115 and another tuning capacitor 119. Tuning capacitor 119 and tuning capacitor 105 are ganged together, as indicated by the dashed line joining these two components, and consequently, both capacitors are variable in unison. Oscillator coil 115 comprises a coil form 118, a tank coil 116, across which capacitor 119 is connected, and a feedback coil 117. As may be seen from the drawing, feedback coil 117 is in the collector lead of transistor 110 and tank coil 116 is coupled by a capacitor 114 to the emitter of transistor 110.

Operating potentials for transistor 110 are supplied from a potential source 108. Potential source 108 feeds collector 113 through a resistor 127, primary winding 121 of transformer 120 and feedback coil 117. Potential source 108 is also connected to a voltage divider comprising resistor 107 and resistor 106. The junction of these resistors is connected to base 111 through antenna coil 103. A capacitor 126 is connected from ground to the junction of resistor 127 and winding 121 and provides a bypass for signal frequencies.

Upon connection of the potential source, an idling current flows from collector 113 to emitter 112 of transistor 110. This idling current traverses feedback coil 117 and results in a voltage being induced in tank coil 116. The resonant circuit, of which tank coil 116 is a part, begins to resonate at a frequency determined by the inductance of coil 116 and the capacitance of capacitor 119. A portion of the voltage developed by the resonant circuit is coupled by capacitor 114 to the emitter of transistor 110. The coils are arranged such that the voltages induced therein are of proper magnitude and phase to cause oscillation in transistor 110.

The radio frequency carrier to which antenna coil 102 and tuning capacitor 105 are tuned develops a potential which is coupled to the base of transistor 110 by coil 103. By transistor action, the radio frequency voltage and the locally generated oscillator voltage are mixed in the collector-emitter circuit of transistor 110 and appear across a tuned circuit comprising transforming winding 121 and capacitor 124.

It should be noted that that antenna circuit and the oscillator circuit are so arranged that frequency-wise they are always a predetermined distance apart. As is well known in the art, when two signals of different frequencies are mixed or heterodyned, beat frequencies, representing sums and differences of the two mixed frequencies, as well as both fundamental frequencies, appear in the output. The tuned circuit in the collector of transistor 110 is tuned to one of these beat frequencies and develops a voltage responsive thereto, whereas remaining frequencies are bypassed to ground through capacitor 126.

Winding 121 is part of transformer 120, which also includes a secondary winding 122 and a tuning element 123. As the beat frequencies produced by mixing the received radio frequency carrier with the locally generated oscillator signal will always be the same, transformer 120 may be tuned very sharply to this frequency and maximum gain may be achieved.

The beat frequency, or intermediate frequency as it is commonly called, is then coupled to base 131 of transistor 130 via winding 122 and bypass capacitor 128. Operating potential is applied to collector 133 of transistor 130 from potential source 108 through a resistor 138 and through primary winding 141 of another intermediate frequency transformer 140. The junction of resistors 129 and 134, which form a voltage divider network, is connected to winding 122 of transformer 120. This junction is also connected to serially connected resistors 145 and 153. Emitter 132 is connected, through secondary winding 142 of transformer 140, to a detector diode 150, which has its other terminal returned to the junction of resistors 145 and 153. Emitter 132 is connected to ground through a potentiometer 135, which serves as a volume control for the subsequent audio amplifier 147. Emitter 132 is further connected to the junction between resistor 138 and the collector tuned circuit through a bypass capacitor 137. This capacitor is sufficiently large to bypass intermediate frequency signals, but does not bypass audio frequency signals.

It should be noted that collector resistor 138 is bypassed by a large capacitor 139. Thus it will be seen that for nearly all alternating current voltages, resistor 138 is at ground potential since capacitor 139 is large and the impedance of potential source 108 is small.

Another diode 125 is connected between points X and Y, which for I-F signal purposes is connected in parallel with the tuned circuit in the collector of transistor 110. This may be verified by tracing a path from point X, through diode 125 to point Y, through capacitor 139, through battery 108 to ground, through capacitor 126, and through the tuned circuit back to point X. Diode 125 is effectively a variable resistance connected across the tuned circuit. The resistance of diode 125 is dependent upon the bias conditions appearing across its terminals and will decrease in accordance with bias changes which tend to drive the diode conductive.

As is well known, the resistance connected in parallel with a tuned circuit has a marked effect upon the "Q" of the circuit. By decreasing this resistance, the "Q" of the tuned circuit is lowered and hence its effective gain reduced. In an autodyne converter, this "lowering of the 'Q' of a tuned circuit" is utilized to provide normal automatic gain control, as well as overload protection since conventional AGC methods would upset the frequency of the local oscillator.

As was seen before, the intermediate frequency signal is developed across secondary winding 122 of transformer 120 and impressed across base 131 and emitter 132 of transistor 130. This signal is amplified by transistor 130 and appears across the tuned circuit connected to collector 133. This tuned circuit comprises winding 141 of transformer 140 and parallelly connected capacitor 144. Transformer 140, like transformer 120, is peaked at the intermediate frequency by adjustment of core 143.

The amplified intermediate frequency signal in the collector of transistor 130 is coupled via winding 142 of transformer 140 to diode detector 150, where it is rectified. Due to the action of capacitor 155, a potential which has two major components is developed at the junction of this capacitor and resistor 153. These components are (1) the audio frequency component which is the original amplitude modulation of the received R-F carrier; and (2) a direct current component which is a function of the signal strength of the R-F carrier. Both of these components are fed back through resistor 145 and transformer winding 122 to the base of transistor 130. The audio frequency or A.C. component is amplified by transistor 130. The D.C. component is also amplified, but in a negative sense. That is, due to the polarity of diode 150, the D.C. potential developed across resistors 153 and 152 is positive. This positive potential, when fed back to the base of transistor 130 has the dual effect of reducing both the gain of the transistor and its collector-emitter current. It should be noted that the magnitude of the gain reduction is determined by the bias point of transistor 130, its characteristics, and the circuit constants.

The audio frequency component is amplified by transistor 130 and appears across potentiometer 135 in its emitter lead. The D.C. component, as mentioned previously, causes a decrease in the collector-emitter current of transistor 130 and hence, the potential at point Y changes. Under "no signal" conditions, the potential at point Y will be a value determined by the characteristics of the circuit, which will in turn determine the quiescent collector-emitter current of transistor 130.

Under signal conditions, transistor 130 operates as a D.C. amplifier, in a negative sense, by virtue of diode 150 and the feedback circuit previously traced. Thus a decrease in the collector-emitter current of transistor 130 occurs, which decrease is related to the signal strength, and point Y accordingly swings more negative.

This negative voltage swing at point Y has the effect of increasing the forward current bias across diode 125 and thus decreasing its resistance. A decrease in the diode resistance causes a decrease in the gain of the tuned circuit connected in the collector of transistor 110 and consequently a decrease in the signal level impressed across the base-emitter input of transistor 130. Thus a form of AGC is had which is suitable for use with an autodyne type converter. It will also be seen that transistor 130 performs three functions, namely, that of intermediate frequency amplification, audio frequency amplification, and D.C. amplification. In this particular form of the invention however, the D.C. amplification is in a negative sense and is utilized to provide automatic gain control for transistor 130 directly and, via the mechanism of diode 125, automatic gain control for the preceding circuit feeding transistor 130.

The amplified audio signal appearing across potentiometer 135 in the emitter of transistor 130 is coupled by a capacitor 146 to a subsequent audio amplifier 147 which feeds a speaker 148. Capacitor 146 allows only A.C. variations to appear at the input of audio amplifier 147 and consequently changes in D.C. current through potentiometer 135 are isolated from the succeeding audio circuits.

In FIG. 4, capacitor 136 is used for equalization purposes and capacitor 155 is returned to emitter 132 to reduce the audio signal degeneration which would occur if capacitor 155 was returned to ground.

In FIG. 5 there is shown an embodiment of the invention utilized in an autodyne converter receiver incorporating a double emitter transistor. Transistor 110′ includes a base electrode 111′, a collector electrode 113′ and separate emitter electrodes 112′ and 112′A. The use of the double emitter transistor allows application of conventional AGC voltage without adversely affecting the frequency of operation of the oscillator.

It will be noted that in FIG. 5, diode 150′ is poled opposite to its corresponding diode 150 in FIG. 4 and similar to diode 30 in FIGS. 2 and 3. Transistor 130 is biased at a point on its operating curve where its gain is substantially independent of its bias and hence is similar to transistor 20 in FIGS. 2 and 3. Diode 125, which it will be recalled was used for AGC purposes in the circuit of FIG. 4, is not incorporated in this circuit since regular AGC is applied to the autodyne converter. This AGC voltage is taken from the network, comprising resistor 160 and capacitor 161, connected to emitter 132 of transistor 130.

The operation of the circuit of FIG. 5 is substantially the same as that of the circuit of FIG. 4. Diode 150′ however feeds back a direct current voltage to base 131 which has the same polarity as the normal bias thereon. Hence with signal, the base-emitter bias of transistor 130 increases and a corresponding increase in current occurs in its collector-emitter circuit. Consequently, the voltage of emitter 132 of transistor 130 swings in a negative direction. Resistor 160 and capacitor 161 filter the developed negative AGC voltage and apply it to emitter 112′A of transistor 110′. Application of this AGC voltage thereto decreases the gain of transistor 110′ without affecting its frequency of oscillation.

There are of course many methods which may be employed to bias the transistors and the fact that particular bias schemes have been shown, in an effort to disclose the invention in a complete and operable environment, should not be construed as a limitation of the invention. It is appreciated that problems of interchangeability of transistors, current drain from the potential source, etc. must be taken into consideration when designing a circuit. These details are believed to be within the ordinary skill of one working in the art.

What has been described is a novel circuit arrangement whereby an additional function may be obtained from a conventional reflex type circuit. While the invention has been described in the environment of a transistorized radio receiver for receiving amplitude modulated signals, it will be readily appreciated by those skilled in the art that this invention may be utilized in many other forms of electronic apparatus including apparatus for receiving frequency and phase modulated signals. It is understood that the invention is to be limited only as defined in the appended claims.

What is claimed is:

1. A signal translation system comprising; means including an electronic valve for amplifying a first signal having a carrier frequency wave component and an audio frequency modulation component; means coupled to said valve for developing a second signal by detection of said first signal after amplification of said first signal by said valve, said second signal comprising said audio frequency component and a direct current portion representative of the level of said carrier wave component; a direct current feedback circuit for feeding back said second signal to said valve for amplification thereby; means in the output of said valve responsive only to the audio frequency component of said second signal; and means in the output of said valve responsive only to said direct current portion of said second signal.

2. In combination in a signal translation system; an electron valve having an input circuit and first and second output circuits; means for impressing a carrier wave signal including modulation information on said input circuit; said valve translating the impressed signal and developing a like signal in said first output circuit; means coupled to said first output circuit for detecting the translated signal therein and for feeding the detected signal back to said input circuit, said detected signal including a first current component which varies in accordance with said modulation information in the impressed signal and a second current component which varies in accordance with the strength of the carrier wave of the impressed signal; said valve translating both said first current component and said second current component and developing a translated first current component and a translated second current component in said second output circuit; means coupled to said second output circuit responsive only to said translated first current component; and means coupled to said second output circuit responsive only to said translated second current component.

3. In combination in a signal translation system for translating signals each of which includes a carrier frequency component with a superimposed amplitude modulation component and in which the level of the carrier frequency components may differ; an electronic valve having an input circuit and an output circuit; means for selectively impressing one of said signals on said input circuit, said electronic valve translating said one signal and developing a like signal in said output circuit; first means in said output circuit responsive only to said one signal; detecting means coupled to said first means for developing a detected signal having a direct current portion representative of said carrier frequency component level of said one signal and an alternating current portion varying as a function of said amplitude modulation component of said one signal; means for feeding back at least part of said detected signal to said input circuit, said valve translating said detected signal and developing another signal in said output circuit; second means in said output circuit, responsive only to said alternating current portion, for separating said alternating current portion from said another signal; and third means in said output circuit for developing a control voltage in response to said direct current portion of said another signal.

4. In radio receiving apparatus of the type adapted to receive radio frequency carrier waves which are modulated with audio frequency waves, including means for translating said radio frequency waves into intermediate frequency waves, means for applying said intermediate frequency waves to the input of an electronic valve, circuit means coupled to the output of said valve and responsive to said intermediate frequency waves for detecting said audio frequency waves, means for feeding back said audio frequency waves to the input of said valve, and means coupled to the output of said valve responsive only to said audio frequency waves whereby said valve is utilized to translate both said intermediate frequency waves and said audio frequency waves, the improvement comprising; a direct current connection from said circuit means to the input of said valve; and further means responsive to the direct current level in the output circuit of said valve whereby said valve performs the additional function of direct current amplification.

5. In combination; an electron valve having an input circuit and an output circuit; means for selectively impressing upon said input circuit amplitude modulated carrier waves having different carrier levels; a tuned circuit in said output circuit, said tuned circuit tuned to the frequency of said carrier waves; detecting means coupled to said tuned circuit; a direct current connection between the output of said detecting means and the input of said valve; a direct current bias circuit for said valve, said bias circuit including at least a portion of said direct current connection; said valve amplifying the impressed one of said modulated carrier waves and developing a similar wave signal across said tuned circuit; said detecting means detecting the wave signal across said tuned circuit; said detected wave signal including a modulation component varying in accordance with the modulation of said one carrier wave and a direct current component representative of the level of said one carrier wave; means for feeding back at least a portion of said detected wave signal over said direct current connection to said input circuit of said valve, whereby said valve amplifies both said modulation component and said direct current component; means in said output circuit responsive only to said modulation component; and further means in said output circuit responsive only to said direct current component.

6. In combination in radio receiving apparatus including means for receiving radio frequency waves which are amplitude modulated with audio frequency waves, and means for selectively converting said radio frequency waves into an intermediate frequency wave of a particular frequency; a transistor having a base electrode, an emitter electrode, and a collector electrode; a first transformer tuned to said particular frequency coupled between said base electrode and said emitter electrode; a second transformer tuned to said particular frequency coupled between said collector electrode and said emitter electrode; a resistor connected in circuit with said emitter electrode; a unilateral conducting device coupled to the output of said second transformer; a direct current feedback circuit connected between said unilateral conducting device and said base electrode; means for supplying operating potentials to said transistor including means for supplying bias current to said base electrode through said direct current feedback circuit; means for impressing said intermediate frequency wave on said first transformer, said transistor amplifying the impressed wave and developing a corresponding wave signal across said second transformer; said unilateral conducting device detecting said corresponding wave signal and feeding back a detected signal over said direct current feedback circuit; said detected signal including an audio frequency modulation component corresponding to the audio frequency wave modulation on the selected one of said radio frequency waves and a direct current component representative of the signal level of the selected one of said radio frequency waves; said transistor amplifying both said audio frequency modulation component and said direct current component; first means including said resistor responsive only to said audio frequency modulation component; and second means including said resistor responsive only to said direct current component.

7. In combination in radio receiving apparatus including means for receiving radio frequency waves which are amplitude modulated with audio frequency waves, and means for selectively converting said radio frequency waves into an intermediate frequency wave of a particular frequency; a transistor having a base electrode, an emitter electrode, and a collector electrode; a first transformer tuned to said particular frequency coupled between said base electrode and said emitter electrode; a second transformer tuned to said particular frequency coupled between said collector electrode and said emitter electrode; a first resistor connected in circuit with said collector electrode; a second resistor connected in circuit with said emitter electrode; a unilateral conducting device coupled to the output of said second transformer; a direct current feedback circuit connected between said unilateral conducting device and said base electrode; means for supplying operating potentials to said transistor including means for supplying bias current to said base electrode through said direct current feedback circuit; means for impressing said immediate frequency wave on said first transformer, said transistor amplifying the impressed wave and developing a corresponding wave signal across said second transformer, said unilateral conducting device detecting said corresponding wave signal and feeding back a detected signal over said direct current feedback circuit; said detected signal including an audio frequency modulation component corresponding to the audio frequency wave modulation on the selected one of said radio frequency waves and a direct current component representative of the signal level of the selected one of said radio frequency waves; said transistor amplifying both said audio frequency modulation component and said direct current component; means including said first resistor responsive only to said audio frequency modulation component; and means including said second resistor responsive only to said direct current component.

8. A radio receiver comprising; means for selectively receiving one of a plurality of audio information bearing carrier frequency waves and for heterodyning the received one of said waves with the output of a local oscillator to develop an intermediate frequency wave; a first intermediate frequency transformer coupled to said means; a transistor having a base electrode, an emitter electrode, and a collector electrode; said base and said emitter electrodes being coupled to said first transformer; a second intermediate frequency transformer coupled between said collector electrode and said emitter electrode; a diode detector coupled to said second transformer; a direct current bias circuit for the base-emitter circuit of said transistor; a load circuit for said diode detector, said load circuit including a portion of said bias circuit; a feedback circuit connected between the load circuit of said diode and the base-emitter circuit of said transistor, whereby said transistor amplifies said intermediate frequency wave, said intermediate frequency wave is detected and a voltage including said audio information and a direct current portion related to the received carrier wave strength is developed and fed back to said transistor for amplification by said transistor.

9. The radio receiver of claim 8 wherein said load circuit includes a potentiometer, the arm of which is bypassed for audio frequencies whereby variations in the setting thereof affect the magnitude of said audio information in said voltage, but not the magnitude of said direct current portion.

10. A radio receiver as set forth in claim 8 wherein said transistor is normally biased at a point on its operating characteristic where the gain of said transistor decreases with decrease in bias, and wherein said diode detector is poled such that with increasing signal said load circuit develops a potential tending to decrease the bias on said transistor.

11. A radio receiver as set forth in claim 8, further including; a loading diode coupled across said first intermediate transformer; a resistor connected in circuit with the collector electrode of said transistor; a capacitor connected to said resistor in bypass relationship; and a connection between said resistor and said loading diode, whereby the bias across said loading diode is a function of the collector current in said transistor.

12. A signal translation circuit for translating a signal, including a carrier frequency component and a modulation component, comprising; a first electron valve having first input means and a first output circuit; means for impressing said signal on said first input means; a second electron valve having a second input circuit coupled to said first output circuit, and a second output circuit; detecting means coupled to said second output circuit for separating said carrier frequency component from said signal and for developing a voltage having an alternating current component varying in accordance with said modulation component and a direct current component representative of the level of said carrier frequency component; means for feeding back said voltage to said second input circuit; alternating current responsive means coupled to said second output circuit; direct current responsive means coupled to said second output circuit; and filter means coupled between said direct current responsive means and said first input means for applying a control voltage, which is a function of said direct current component, to said first valve to thereby control the translation characteristic of said first valve.

13. A signal translation circuit as set forth in claim 12 wherein said first electron valve comprises a semi-conductor device having a base electrode, a collector electrode and two independent emitter electrodes, one of said emitter electrodes being connected to said filter means.

References Cited in the file of this patent

UNITED STATES PATENTS

| | | |
|---|---|---|
| 2,204,975 | Thierbach | June 18, 1940 |
| 2,777,056 | Bull | Jan. 8, 1957 |
| 2,848,603 | Schultz | Aug. 19, 1958 |
| 2,961,534 | Scott | Nov. 22, 1960 |

OTHER REFERENCES

Philco Data Sheet T1690, July 1959 (1 page).